(12) United States Patent
Mook et al.

(10) Patent No.: US 10,695,704 B2
(45) Date of Patent: Jun. 30, 2020

(54) MULTI-STATION DEBRIS SEPARATION SYSTEM

(71) Applicant: GENERAL ELECTRIC COMPANY, Schenectady, NY (US)

(72) Inventors: Joshua Tyler Mook, Cincinnati, OH (US); John Alan Manteiga, Lynn, MA (US); Gregg Hunt Wilson, Cincinnati, OH (US); Stephen Joseph Waymeyer, Evendale, OH (US); Christopher Robert Williams, Hamilton, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 402 days.

(21) Appl. No.: 15/215,353

(22) Filed: Jul. 20, 2016

(65) Prior Publication Data

US 2018/0021711 A1  Jan. 25, 2018

(51) Int. Cl.
*B01D 45/00* (2006.01)
*B01D 45/16* (2006.01)
*F01D 25/32* (2006.01)
*F01D 5/08* (2006.01)
*B01D 45/08* (2006.01)
(Continued)

(52) U.S. Cl.
CPC ............ *B01D 45/16* (2013.01); *B01D 45/08* (2013.01); *B04C 3/00* (2013.01); *F01D 5/081* (2013.01); *F01D 25/32* (2013.01); *F02C 7/052* (2013.01); *B04C 2003/003* (2013.01); *B04C 2003/006* (2013.01); *F04D 29/441* (2013.01);
(Continued)

(58) Field of Classification Search
CPC ......... B01D 45/16; B01D 45/08; F01D 25/32; F01D 5/081; F02C 7/052; B04C 3/00; B04C 2003/003; B04C 2003/006; F05D 2260/607; Y02T 50/675; Y02T 50/671; F04D 29/441; F04D 29/701
See application file for complete search history.

(56) References Cited

U.S. PATENT DOCUMENTS 3,064,411 A * 11/1962 Breslove, Jr. .......... B01D 45/12
                                                                    55/416
3,066,912 A    12/1962 Scheper, Jr.
(Continued)

FOREIGN PATENT DOCUMENTS

GB     2016-39325 M  *  6/2016
GB        2533586 A     6/2016

OTHER PUBLICATIONS

International Search Report and Written Opinion issued in connection with corresponding PCT Application No. PCT/US2017/042355, dated Oct. 23, 2017.

*Primary Examiner* — Dung H Bui
(74) *Attorney, Agent, or Firm* — Dinsmore & Shohl LLP (57) ABSTRACT

The present disclosure generally relates to separating solid particles from an airflow in a gas turbine engine. A system for separating debris includes a first separation device in fluid communication with an inlet flow path of a compressor and a second separation device in fluid communication with an outlet flow path of the compressor and an inlet flow path of a combustor. The first separation device is adapted to remove coarse particles from the airflow. The second separation device is adapted to remove fine particles from the airflow. The course particles have a larger mean particle diameter than the fine particles.

17 Claims, 9 Drawing Sheets

(51) Int. Cl.
*B04C 3/00* (2006.01)
*F02C 7/052* (2006.01)
*F04D 29/44* (2006.01)
*F04D 29/70* (2006.01)

(52) U.S. Cl.
CPC ........... *F04D 29/701* (2013.01); *Y02T 50/671* (2013.01); *Y02T 50/675* (2013.01); *Y02T 50/676* (2013.01)

(56) References Cited

U.S. PATENT DOCUMENTS

| | | | |
|---|---|---|---|
| 3,073,377 A | 1/1963 | Robinson | |
| 3,309,867 A | 3/1967 | Ehrich | |
| 3,356,340 A | 12/1967 | Bobo | |
| 3,521,431 A | 7/1970 | Connors et al. | |
| 3,534,548 A | 10/1970 | Connors | |
| 3,733,814 A | 5/1973 | Hull, Jr. et al. | |
| 3,832,086 A | 8/1974 | Hull, Jr. et al. | |
| 3,892,612 A | 7/1975 | Carlson et al. | |
| 3,993,463 A | 11/1976 | Barr | |
| 4,158,449 A | 6/1979 | Sun et al. | |
| 4,289,611 A | 9/1981 | Brockmann | |
| 4,309,147 A | 1/1982 | Koster et al. | |
| 4,397,431 A * | 8/1983 | Ben-Porat | B64D 33/02 244/53 B |
| 4,527,387 A * | 7/1985 | Lastrina | F02C 7/052 244/53 B |
| 4,617,028 A | 10/1986 | Ray et al. | |
| 4,622,050 A | 11/1986 | O'Connor | |
| 4,798,047 A | 1/1989 | Geary | |
| 4,901,520 A | 2/1990 | Kozak et al. | |
| 4,928,480 A * | 5/1990 | Oliver | B64D 33/02 55/306 |
| 5,039,317 A | 8/1991 | Thompson et al. | |
| 5,165,236 A | 11/1992 | Nieminen | |
| 5,222,693 A * | 6/1993 | Slutzkin | B01D 45/14 209/139.2 |
| 5,294,410 A | 3/1994 | White | |
| 5,464,479 A | 11/1995 | Kenton et al. | |
| 5,918,458 A | 7/1999 | Coffinberry et al. | |
| 6,499,285 B1 * | 12/2002 | Snyder | B64D 33/02 244/53 B |
| 7,284,953 B2 | 10/2007 | Silverman et al. | |
| 7,695,243 B2 | 4/2010 | Lee et al. | |
| 7,777,155 B2 | 8/2010 | Twelves, Jr. et al. | |
| 7,927,408 B2 * | 4/2011 | Sheoran | B01D 45/04 55/306 |
| 7,931,740 B2 | 4/2011 | Al-Alusi et al. | |
| 8,092,145 B2 * | 1/2012 | Martel | F02C 6/08 415/1 |
| 8,256,277 B2 | 9/2012 | Khibnik et al. | |
| 8,469,309 B2 | 6/2013 | Stuart et al. | |
| 8,506,836 B2 | 8/2013 | Szuromi et al. | |
| 8,561,411 B2 | 10/2013 | Dibenedetto | |
| 8,668,442 B2 | 3/2014 | Morris et al. | |
| 9,046,056 B2 | 6/2015 | Lerg | |
| 9,206,740 B2 * | 12/2015 | Wong | F01D 25/002 |
| 2005/0076646 A1 * | 4/2005 | Bolis | F01K 21/047 60/775 |
| 2005/0081529 A1 * | 4/2005 | Bolis | F01K 21/047 60/775 |
| 2007/0235373 A1 | 10/2007 | Strangman et al. | |
| 2008/0310951 A1 * | 12/2008 | Bremer | F01D 5/081 415/121.2 |
| 2009/0155088 A1 | 6/2009 | Lee et al. | |
| 2010/0162682 A1 * | 7/2010 | Lerg | B01D 45/06 60/226.1 |
| 2010/0287907 A1 * | 11/2010 | Agrawal | F02C 7/052 60/39.091 |
| 2011/0047959 A1 | 3/2011 | Dibenedetto | |
| 2012/0207594 A1 * | 8/2012 | Chanez | F02C 7/05 415/208.1 |
| 2013/0160411 A1 | 6/2013 | Mayer et al. | |
| 2013/0323473 A1 | 12/2013 | Dietsch et al. | |
| 2014/0119891 A1 | 5/2014 | Schmittenberg et al. | |
| 2014/0144123 A1 * | 5/2014 | Judd | B01D 45/04 60/39.092 |
| 2014/0182292 A1 | 7/2014 | Hudon et al. | |
| 2014/0237954 A1 | 8/2014 | Snyder | |
| 2014/0241850 A1 | 8/2014 | Duge | |
| 2014/0286790 A1 | 9/2014 | Molter et al. | |
| 2014/0290254 A1 | 10/2014 | Manning et al. | |
| 2015/0052872 A1 | 2/2015 | Zurmehly et al. | |
| 2015/0192298 A1 * | 7/2015 | Hasel | F23R 3/02 60/774 |
| 2015/0345331 A1 * | 12/2015 | Murray | F01D 25/24 415/220 |
| 2016/0177728 A1 * | 6/2016 | Tanimitsu | F01D 5/146 415/208.1 |
| 2017/0107852 A1 * | 4/2017 | Nasr | F01D 9/04 |
| 2017/0114720 A1 * | 4/2017 | Stone | F02C 7/18 |
| 2017/0211475 A1 | 7/2017 | Mayer et al. | |
| 2017/0284226 A1 * | 10/2017 | Nasir | F01D 25/32 |

* cited by examiner

MULTI-STATION DEBRIS SEPARATION SYSTEM

INTRODUCTION

The present disclosure generally relates to debris separation in a gas turbine engine.

BACKGROUND

In a gas turbine engine, intake air is compressed by a compressor. Fuel is added to the compressed air and ignited in a combustor. The expanding hot air passes through a turbine and out of a nozzle providing thrust. The turbine converts some of the energy of the expanding hot air into rotational energy for powering the compressor.

Various components of a gas turbine engine may be damaged and/or degraded when the intake air contains particles such as sand and dust. For example, sand may cause abrasion to compressor blades. As another example, dust may clog cooling holes and/or reduce cooling performance in the turbine resulting in higher turbine temperatures. The damage to the engine components reduces the efficiency and lifespan of the engine.

Debris removal systems for gas turbine engines generally attempt to remove all types of debris from the intake air using a single separator. While a single separator may reduce the total amount of debris entering the components of the gas turbine engine, a single separator may not efficiently remove different types of debris. For example, if the single separator is optimized for removing large particles, small particles may pass through the compressor to the combustor and turbine. On the other hand, if the single separator is optimized for removing smaller particles, large particles may pass through the compressor, damaging the compressor. Further, the compressor may pulverize larger particles into smaller particles that may also damage the turbine.

In view of the above, it can be appreciated that there are problems, shortcomings or disadvantages associated with debris separation in gas turbine engines, and that it would be desirable if improved systems and methods for separating debris from an airflow in a gas turbine engine were devised.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a system for separating debris from an airflow in a gas turbine engine. The system includes a first separation device in fluid communication with an inlet flow path of a compressor. The first separation device adapted to remove coarse particles from the airflow. The system also includes a second separation device in fluid communication with an outlet flow path of the compressor and an inlet flow path of a combustor. The second separation device is adapted to remove fine particles from the airflow. The course particles have a larger mean particle diameter than the fine particles.

In another aspect, the disclosure provides a gas turbine engine. The gas turbine engine includes a first separation device that receives ambient air including entrained solid particles and removes at least 80 percent of the solid particles having a mean particle diameter between 80 micrometers and 1000 micrometers from the ambient air. The gas turbine engine also includes a compressor that receives the ambient air from the first separation device and generates compressed air. The gas turbine engine further includes a second separation device that receives compressed air from the compressor including entrained solid particles having a mean particle diameter less than 5 micrometers and removes at least 70 percent of the entrained solid particles from the compressed air.

In another aspect, the disclosure provides a method of removing solid particles from an airflow in a gas turbine engine including a compressor and a combustor. The method includes receiving ambient air including entrained solid particles. The method further includes removing at least 80 percent of the entrained solid particles having a mean particle diameter between 80 micrometers and 1000 micrometers from the ambient air before the compressor. The method also includes compressing the ambient air in the compressor to generate compressed air including entrained solid particles having a mean particle diameter less than 5 micrometers. The method additionally includes removing at least 80 percent of the entrained solid particles from the compressed air before the combustor.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear or outlet of the engine, or a component being relatively closer to the outlet than the inlet.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Figure 1:
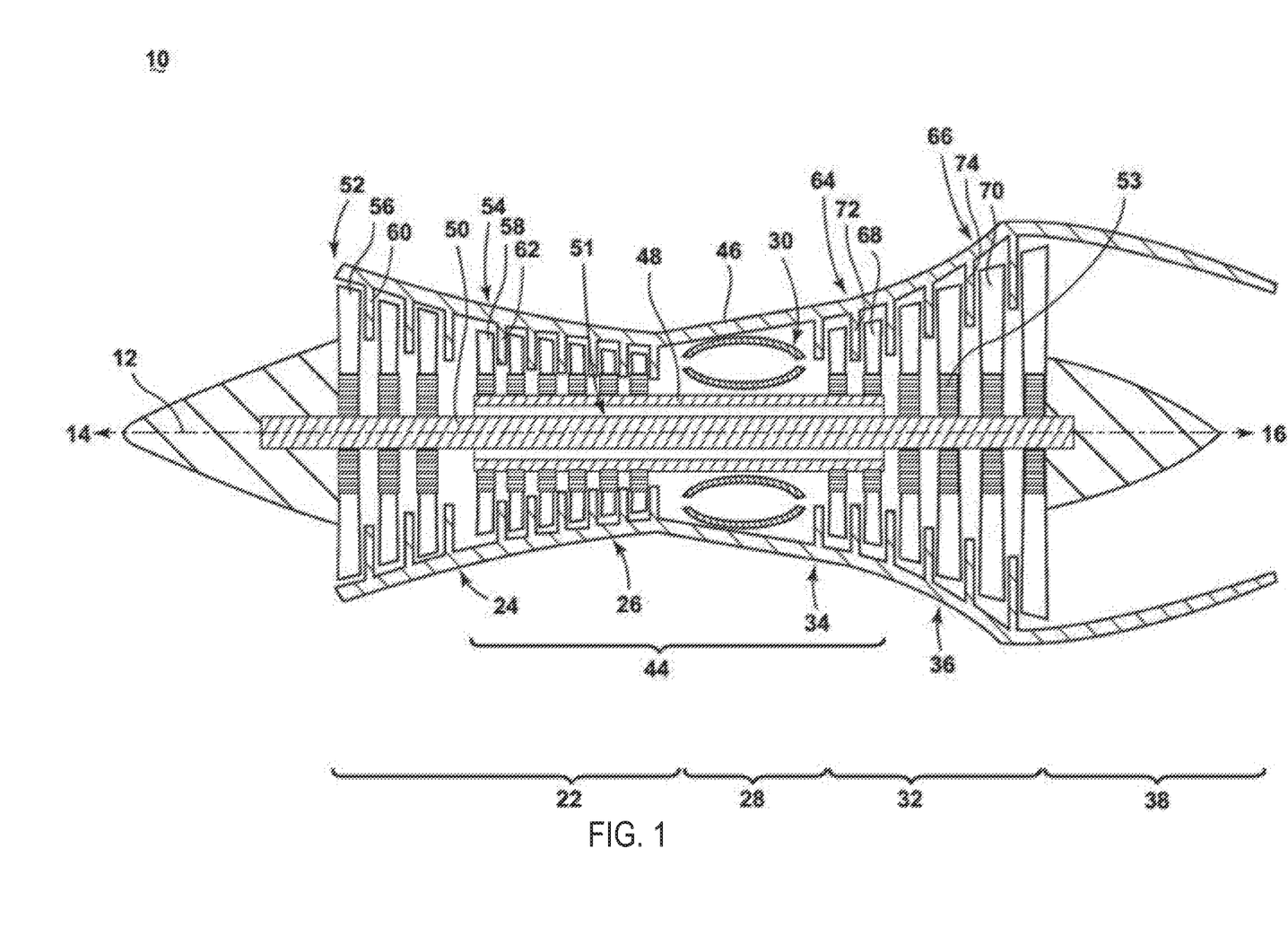
FIG. 1 is a schematic diagram showing a side section view of aspects of a conventional gas turbine engine.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The HP compressor 26, the combustor 30, and the HP turbine 34 form a core 44 of the engine 10, which generates combustion gases. The core casing 46 surrounds the core 44.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can mount to a disk 53, which mounts to the corresponding one of the HP and LP spools 48, 50, with each stage having its own disk. The vanes 60, 62 mount to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, air is supplied to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the LP compressor 24.

Some of the ambient air can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
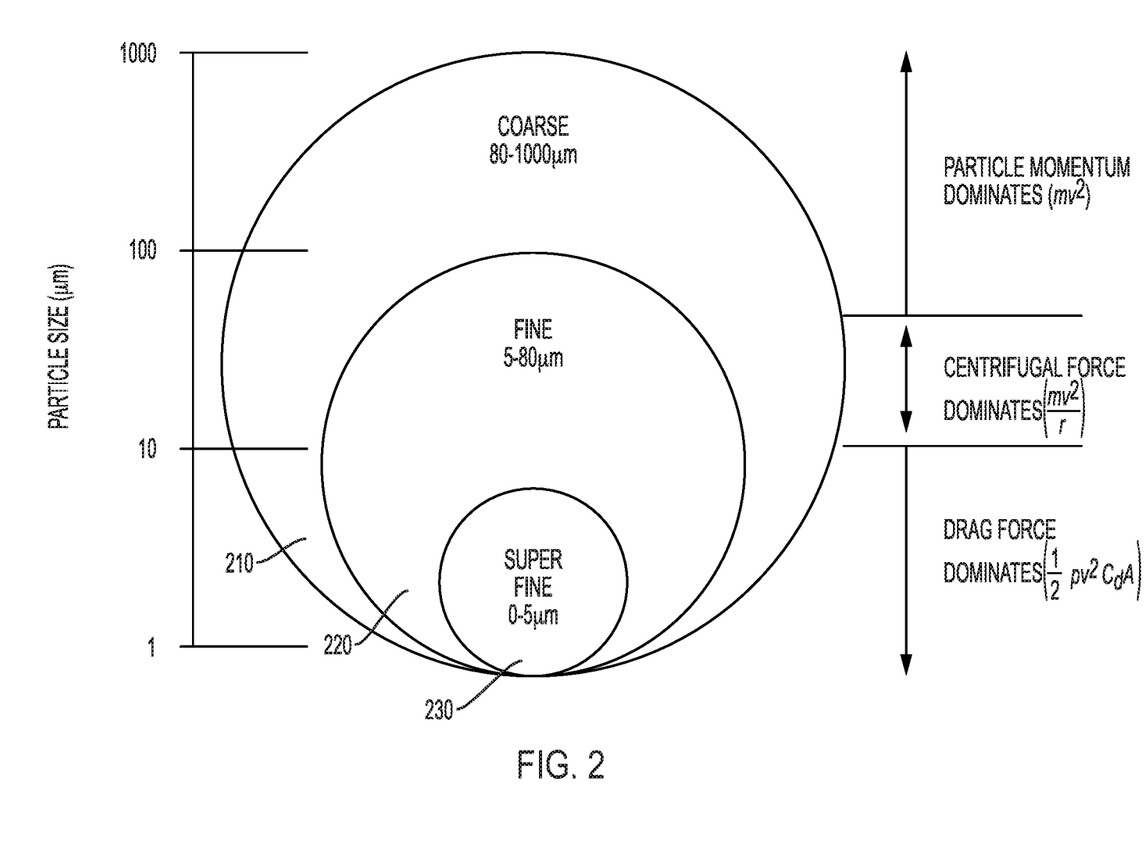
FIG. 2 is a diagram illustrating an example classification of debris particle sizes.

FIG. 2 is a diagram 200 illustrating an example classification of debris particle sizes. The diagram 200 illustrates three classifications of particle size, coarse particles 210, fine particles 220, and superfine particles 230. The coarse particles 210 generally have a mean particle diameter smaller than 1000 micrometers (microns or µm) and generally larger than 80 µm. The coarse particles 210 may be, for example, sand. The fine particles 220 generally have a mean particle diameter smaller than 80 µm and generally larger than 5 µm. The superfine particles 230 generally have a mean particle diameter smaller than 5 µm. In an aspect, the term "fine" may be used to describe both fine particles 220 and superfine particles 230. The different particle sizes may behave differently within an airflow in a gas turbine engine, have different effects in a gas turbine engine, and damage different components of the gas turbine engine. For example, the behavior of coarse particles 210 is dominated by particle momentum. That is, the coarse particles 210 tend to travel in a line. The behavior of fine particles 220, however, may be dominated by centrifugal force. For example, fine particles may be pulled to the outside of the gas turbine engine as an air flow swirls. In contrast, the behavior of superfine particles 230 is dominated by drag force. For example, superfine particles 230 travel with the airflow and may stick to surfaces of the gas turbine engine. Coarse particles 210 tend to damage compressor rotor assemblies and impellers. In particular, the coarse particles 210 cause burrs and rollover on the leading edge of impellers and also round the tips as the coarse particles 210 abrade the spinning parts. Superfine particles 230 tend to accumulate on or within the combustor 30 or the turbine 34, 36. For example, superfine particles 230 may accumulate within cooling holes of the turbine blades and eventually block the cooling holes, leading to a rise in turbine temperature.

Figure 3:
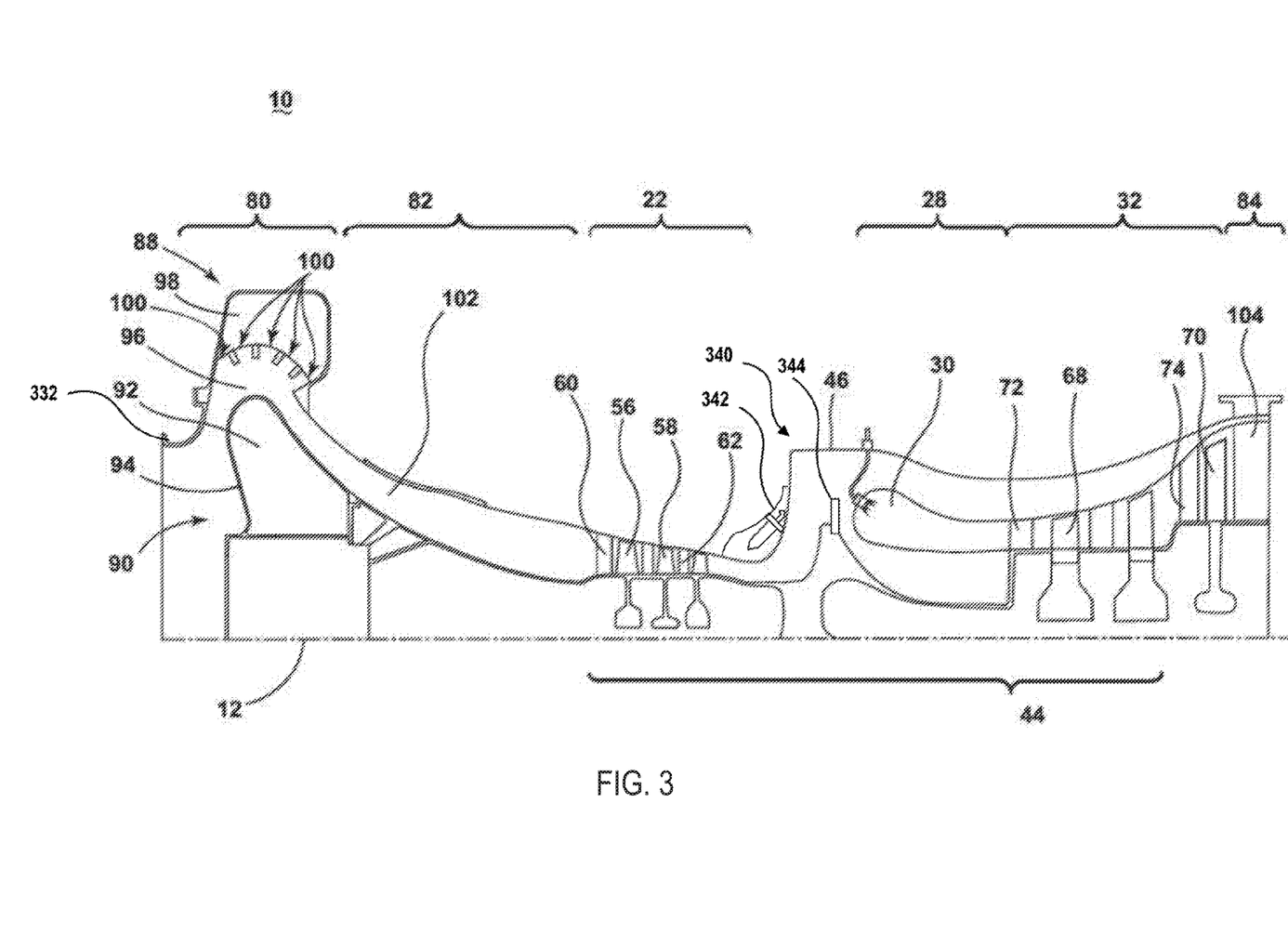
FIG. 3 is a schematic diagram of an exemplary gas turbine engine with a multi-station debris separation system.

FIG. 3 is a cross-section of the gas turbine engine 10 with a multi-station debris separation system including an inlet particle separator 88 and a multi-stage separator 340. The cross-section of the gas turbine engine 10 illustrates an inlet section 80 and a conduit section 82 in axial arrangement upstream of the compressor section 22, and an outlet section 84 downstream of the turbine section 32. The inlet section 80 has an inlet particle separator 88 having an inlet 90, a centerbody 92, and a scavenge plenum 98. Depending on the configuration of the gas turbine engine 10, the inlet section 80 receives an inlet airflow of ambient air which may be directed into the inlet section 80 by a fan or prop (not shown) powered by the HP spool 48 or LP spool 50. The inlet section 80 includes a rim 332 separating the inlet air flow to the core 44 from a bypass air flow outside of the core 44. The inlet particle separator 88 is positioned radially distal to the rim 332. As will be described in further detail below with respect to FIG. 4, the inlet particle separator 88 is adapted to separate coarser particles from the inlet airflow. Inlet particle separator 88 is in fluid communication with the compressor section 22 and coarser particles may abrade the blades 58 of the compressor section 22.

The inlet 90 defines an opening for providing a flow of air to the downstream sections. Axially downstream of the inlet 90 is the centerbody 92 having an impact surface 94 formed by a portion of the centerbody 92, confronting a flow of air provided from the inlet 90. An inlet duct 96 is defined about the centerbody 92 and radially, outwardly bounded by the scavenge plenum 98 in fluid communication with the inlet duct 96. One or more plenum inlets 100 provide fluid communication between the inlet duct 96 and the scavenge plenum 98. The inlet 90, centerbody 92, and the scavenge plenum 98 are all annular, such that the inlet duct 96 is radially defined around the engine centerline 12. It is contemplated that the scavenge plenum 98 can alternatively comprise other scrolls, scavenge conduits, or can be a combination of multiple scavenge conduits arranged radially about the engine centerline 12.

The conduit section 82 has a flow conduit 102 fluidly coupling the inlet duct 96 to the compressor section 22 of the engine 10. The flow of air provided to the inlet 90 can pass around the centerbody 92 through the inlet duct 96 and to the flow conduit 102, providing air to the compressor section 22. The outlet section 84 has one or more struts 104 arranged radially around the engine centerline 12.

Figure 4:
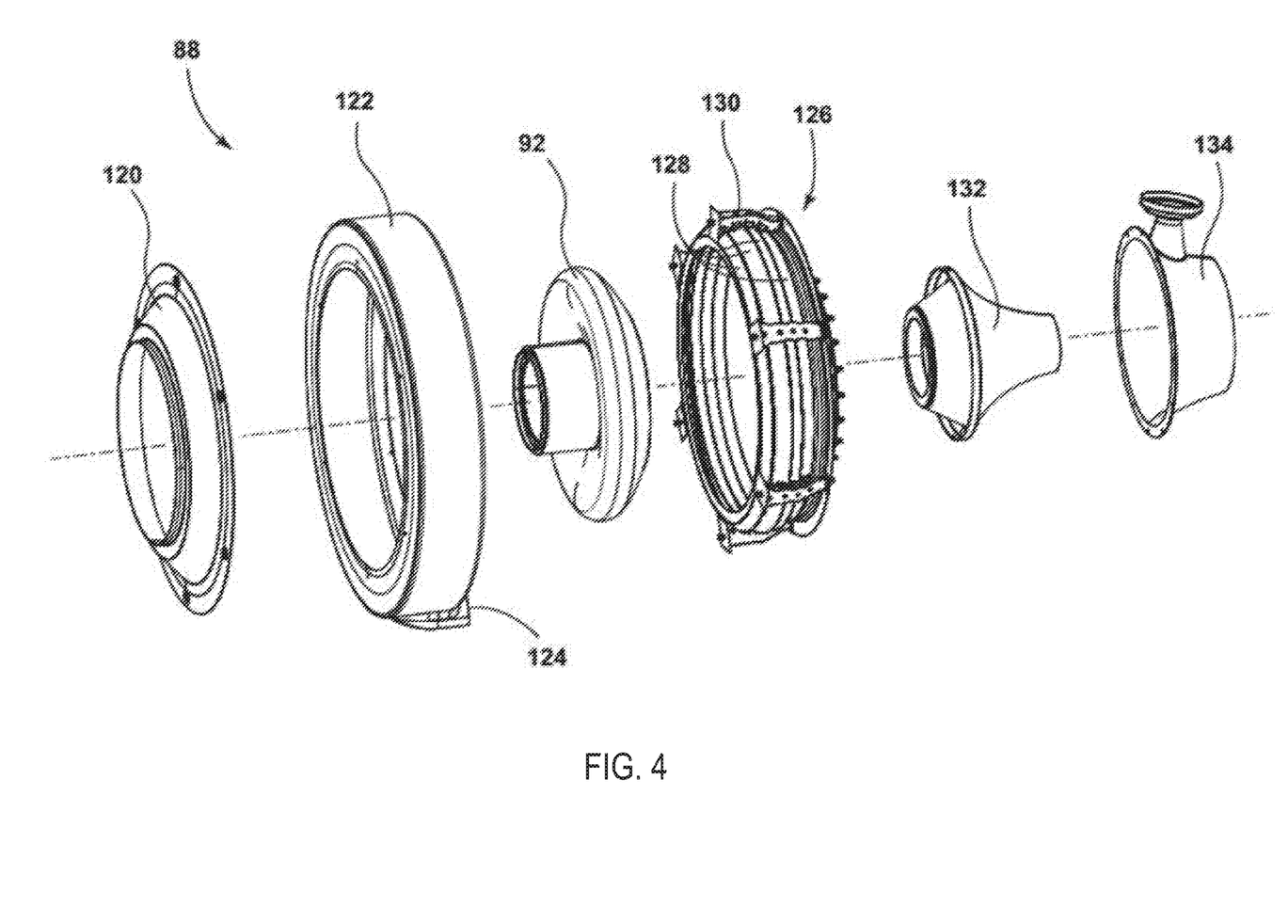
FIG. 4 is a side section view of an exemplary inlet particle separator.

Turning to FIG. 4, an exploded view of the inlet particle separator 88, best illustrating the combination of the components for providing an airflow to the engine core 44. A front plate 120 mounts to a scavenge conduit 122, defining the scavenge plenum 98. The front plate 120 and centerbody 92 for the radially outward flowing inlet to the turn 96. Particles are accelerated in a radially outward direction for scavenging through the plenum inlets 100. The scavenge conduit 122 has a scavenge outlet 124 for providing a scavenge flow of air overboard. Radially within the scavenge conduit 122 is the centerbody 92. A scavenge inlet section 126 can comprise a plurality of annular scavenge vanes 128 mounted to one or more bands 130 to define the plenum inlets 100 of FIG. 3. The scavenge vanes 128 comprise wedge-shaped bodies oriented to define a radial disposition of the plenum inlets 100 is radial. Alternatively, it is contemplated that the scavenge vanes 128 can be any shape, such that the wedge-shape is non-limiting. Furthermore, the disposition of the scavenge vanes 128 can define an axial orientation for the plenum inlets 100. While four scavenge vanes 128 are shown, any number of scavenge vanes 128 is contemplated to define any number of plenum inlets 100. An inner member 132 and an outer member 134 can define the radially inner and outer bounds of the flow conduit 102 axially downstream of the centerbody 92. The centerbody 92 and the inner member can couple in axial arrangement, being supported within the outer arrangement of the scavenge conduit 122 and the scavenge inlet section 126.

The structural elements of the inlet particle separator 88 are easily interconnectable to form the inlet particle separator 88. The inlet particle separator 88 can be mechanically removable from the conduit section 82. Installation and maintenance of the inlet section 80 is facilitated with easy of removability. It should be understood, however, that differing manufacturing combinations are possible to develop the apparatus disclosed herein. Further details of the inlet particle separator 88 and operation thereof are described in copending U.S. application Ser. No. 15/002,839, filed Jan. 21, 2016, titled "INLET PARTICLE SEPARATOR FOR A TURBINE ENGINE," which is incorporated herein by reference in its entirety.

The inlet particle separator 88 is designed to remove larger particles whose separation force is dominated by particle momentum, and to a lesser degree centrifugal forces. The inlet separator removes at least 80%, and preferably 95% or more, of the coarse particles (80-100 microns) from the inlet airstream. The inlet separator removes at least 70%, preferably 80% or more, of the fine particles (5-80 microns) from the inlet stream. The inlet separator removes approximately 50% of the superfine material. Because of the overall design of the system, removal of superfine material at this stage is not critical. The remainder of the coarse and fine material passing through the compressor section 22 is generally pulverized into fine and superfine material resulting in an addition of particulate superfines on top of what was not removed at the inlet particle separator 88.

The multi-stage separator 340 is located downstream from the compressor section 22, which compresses the inlet air flow and provides a compressed air flow. The compressor section 22 also pulverizes larger particles remaining within the input airflow after the inlet particle separator 88 into smaller particles (e.g., superfine particles). The multi-stage separator 340 includes one or more separators that bleed a portion of the compressed airflow for various uses. For example, the multi-stage separator 340 includes a cyclonic separator 342 and a clean air offtake 344. In an aspect, the multi-stage separator 340 is adapted to remove smaller particles (e.g., fine and superfine particles) from the compressed airflow. The multi-stage separator 340 will be described in further detail below with respect to FIGS. 5 and 6. The multi-stage separator 340 is designed to remove fine and superfine particulate passing through the compressor.

Preferably at least 70%, more preferably 80%, of the remaining material is removed at this stage.

Figure 5:
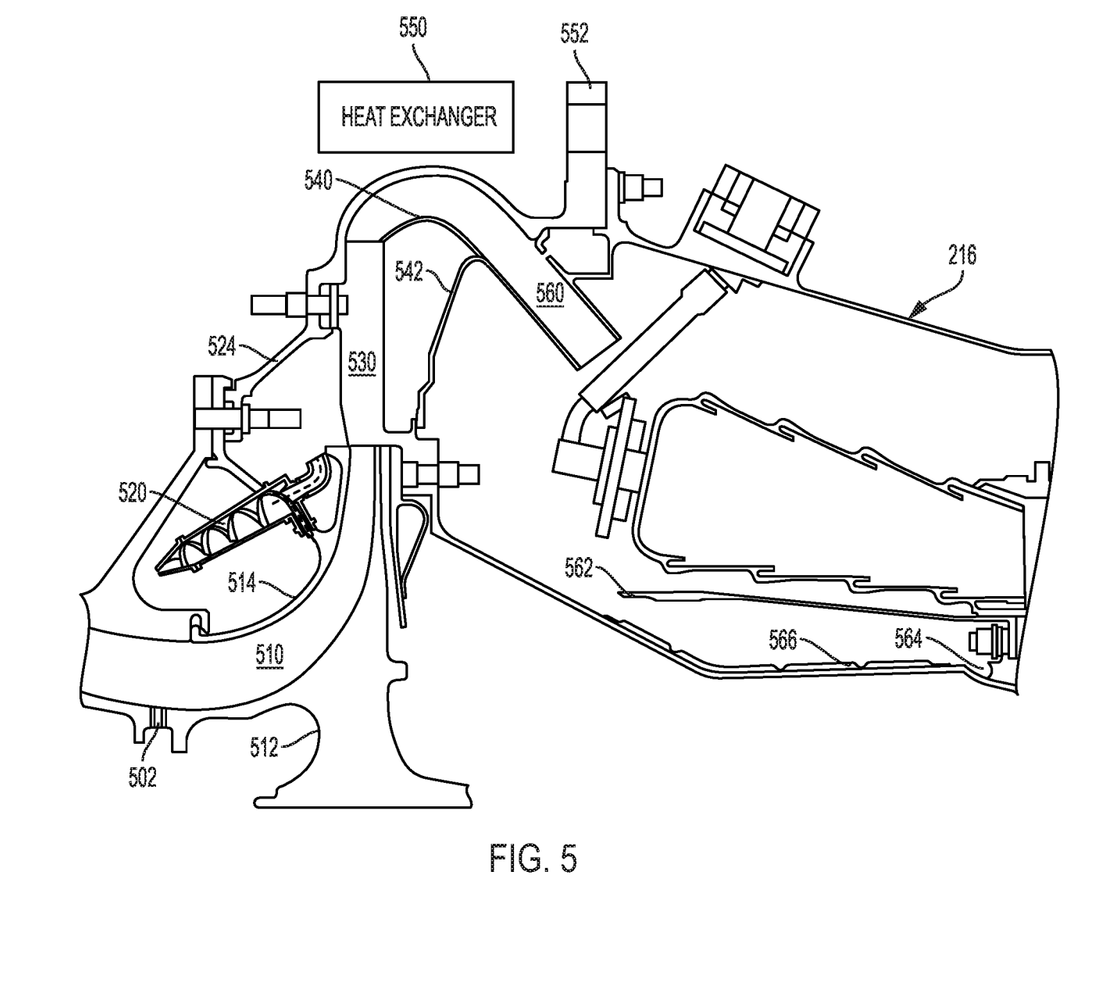
FIG. 5 is a side section view of an exemplary multi-stage particle separator.

FIG. 5 is a side section view of the multi-stage separator 340. The multi-stage separator 340 receives a compressed air flow from the compressor 314. In particular, the compressor impeller 510 is a last stage of the compressor section 22. As illustrated, the compressor impeller 510 is a centripetal impeller that further compresses the airflow and pushes the air in a radially distal direction against an impeller shroud 514. The impeller shroud 514 defines a portion of the flowpath having a reduced cross-section. As the compressed airflow leaves the compressor impeller 510, the airflow accelerates. The compressor impeller 510 and the impeller shroud 514 also turn the airflow in a radial distal direction. A compressor case 518 supports the impeller shroud 514 and also defines a space outside of the main flowpath between the compressor case 518 and the impeller shroud 514.

The multi-stage separator 340 includes a cyclonic separator 520, a diffuser 530, a clean air offtake 540, an optional heat exchanger 550, and a deswirler 560. The cyclonic separator 520 includes an intake 516 located along a radially distal surface of the impeller shroud 514. The radially distal surface defines a surface of the flowpath as the compressor impeller 510 turns the airflow in the radially distal direction. The intake 516 for example, includes a cowl having a at least one opening within the radially distal surface of the impeller shroud 514. For example, the at least one opening may be a continuous slit or a plurality of openings. Because the solid particles entrained within the compressed airflow 504 are mostly superfine particles 230, the drag force tends to dominate, and the particles concentrate along the radially distal surface of the impeller shroud 514. A portion of the compressed airflow enters the cyclonic separator 520 via the plurality of openings, carrying the solid particles into the cyclonic separator 520.

In an embodiment, the cyclonic separator 520 includes a plurality of cyclonic chambers surrounding the impeller shroud 514. The cyclonic separator 520 is adapted for separating superfine particles because the drag force causes superfine particles to remain in an outer vortex while relatively clean air can be extracted from an inner vortex. The relatively clean air exits through an outlet to form a clean airflow while the solid particles are collected in a collection chamber. The collection chamber is a sealable collection chamber that is sealed during operation of the gas turbine engine 300. Accordingly, the compressed airflow 504 does not lose pressure to a vent. The collection chamber is vented during a shutdown, cleaning, or startup operation. For example, the collection chamber is vented when an air starter is used to start the gas turbine engine 300.

The diffuser 530 conveys a first remaining portion of the compressed airflow 504 in the radially distal direction towards a deswirler 560. The diffuser 530 is supported by the diffuser case 524. The diffuser case 524 and the diffuser 530 define a flowpath for a cleaned airflow from the cyclonic separator 520. In other words, the cleaned air from the cyclonic separator 520 flows within the diffuser case 524 without reentering the primary airflow within the diffuser 530. Ducts or passages between walls of a multi-walled component (e.g., the deswirler 560) route the cleaned airflow to an optional heat exchanger 550 and downstream cooling and/or pressurization uses.

The deswirler 560 is located about a radially distal edge of the diffuser 530. The deswirler 560 turns the airflow in an axially aft direction and reduces lateral movement of the airflow. A radially distal surface of the deswirler 560 is defined in part by an engine mount 552 that forms a radially distal wall of the gas turbine engine 300. The clean air offtake 540 is located at a radially proximal surface of the deswirler 560. For example, the clean air offtake 540 includes an opening within the radially proximal surface of the deswirler 560 forming an inlet to the clean air offtake 540. Due to centrifugal force and drag forces, the remaining solid particles entrained within the primary airflow tend to drag along the radially distal surface of the diffuser 530 and the engine mount 552. Accordingly, the clean air offtake 540 separates a portion of relatively clean air from the compressed primary airflow. In an aspect, the clean air offtake 540 further includes a deflector partially covering the inlet to the clean air offtake 540. The deflector deflects solid particles away from the inlet to the clean air offtake 540 to provide a cleaner airflow within the clean air offtake 540.

The clean air offtake 540 also includes ducts or passages that form a secondary flowpath to an optional heat exchanger 550 and downstream cooling uses. A remaining portion of the compressed primary airflow travels through the deswirler 560 into the combustor 316.

The optional heat exchanger 550 cools one or more cleaned airflows. For example, the heat exchanger 550 is in fluid communication with the cyclonic separator 520 or the clean air offtake 540. The heat exchanger 550 includes separate flowpaths for the one or more cleaned airflows and for a relatively dirty waste airflow. For example, the waste airflow may be a bypass airflow or ambient air. The cleaned airflows may be a first cleaned airflow from the cyclonic separator 520 or a second cleaned airflow from the clean air offtake 540. Heat from the cleaned air flows, which are compressed, is transferred into the dirty airflow, which is then vented.

Figure 6:
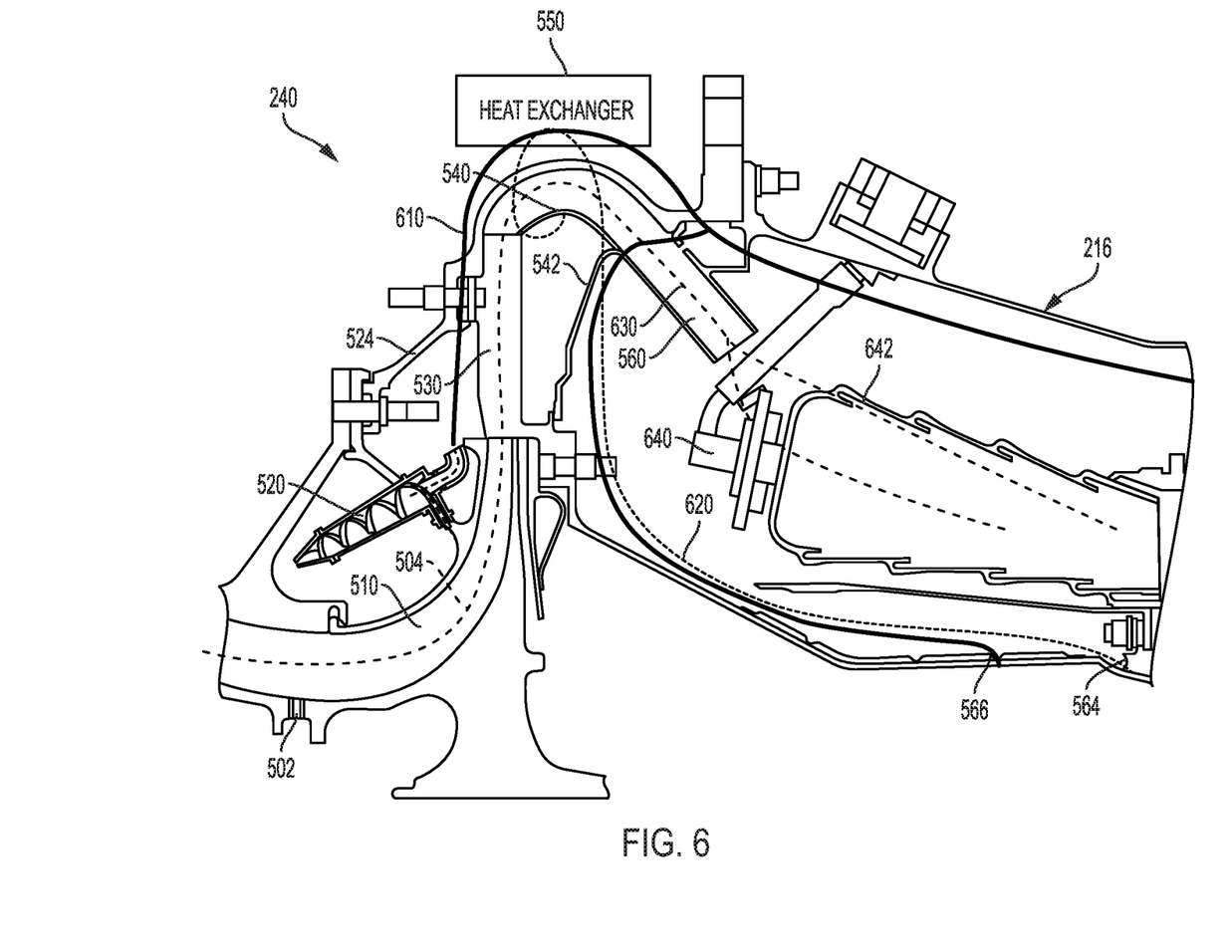
FIG. 6 is a side section view showing flowpaths within the exemplary multi-stage particle separator of FIG. 5.

FIG. 6 is a side section view showing airflows within the exemplary multi-stage separator 340. The compressor 314 provides a compressed airflow 504 from the compressor impeller 512 towards the impeller shroud 514, where the cyclonic separator 520 bleeds of a portion of the compressed airflow 504 and produces a first cleaned airflow 610. A remaining portion of the compressed airflow 504 travels through the diffuser 530 until the clean air offtake 540 bleeds off a second cleaned airflow 620. The remaining portion of the compressed airflow 504 becomes the flowpath airflow 630, which flows to the combustor 316. The flowpath airflow 630 enters the combustor 316 via a fuel nozzle 640, where the flowpath airflow 630 is mixed with fuel and ignited. The flowpath airflow 630 also enters the combustor 316 via openings in the combustor liner 642.

The second cleaned airflow 620 may be the cleanest airflow. For example, the second cleaned airflow 620 may have a lower concentration of solid particles than the compressed airflow 504, the first cleaned airflow 610, or the flowpath airflow 630. The second cleaned airflow 620 may be used to cool a first stage of a high pressure turbine 320. The second cleaned airflow 620 flows through an optional heat exchanger 550 on its way to the high pressure turbine 320. Ducts or passages within the multi-walled components of the gas turbine engine 300 route the second cleaned airflow 620 to an accelerator 564. The second cleaned airflow 620 is passed from the accelerator 564 through the turbine blades via cooling holes and provides for thin film cooling of the turbine blades.

The first cleaned airflow 610 is routed to a second stage of the high pressure turbine 320. The first cleaned airflow 610 may be of lower pressure than the second cleaned airflow 620. Ducts or passages within the multi-walled components of the gas turbine engine 300 route the first cleaned airflow 610 to the second stage of the high pressure turbine via an outer shell of the combustor 216 and via a bearing sump 566. The second stage of the high pressure turbine 320 may operate at a lower temperature than the first stage of the high pressure turbine and be less susceptible to damage from solid particles.

Figure 7:
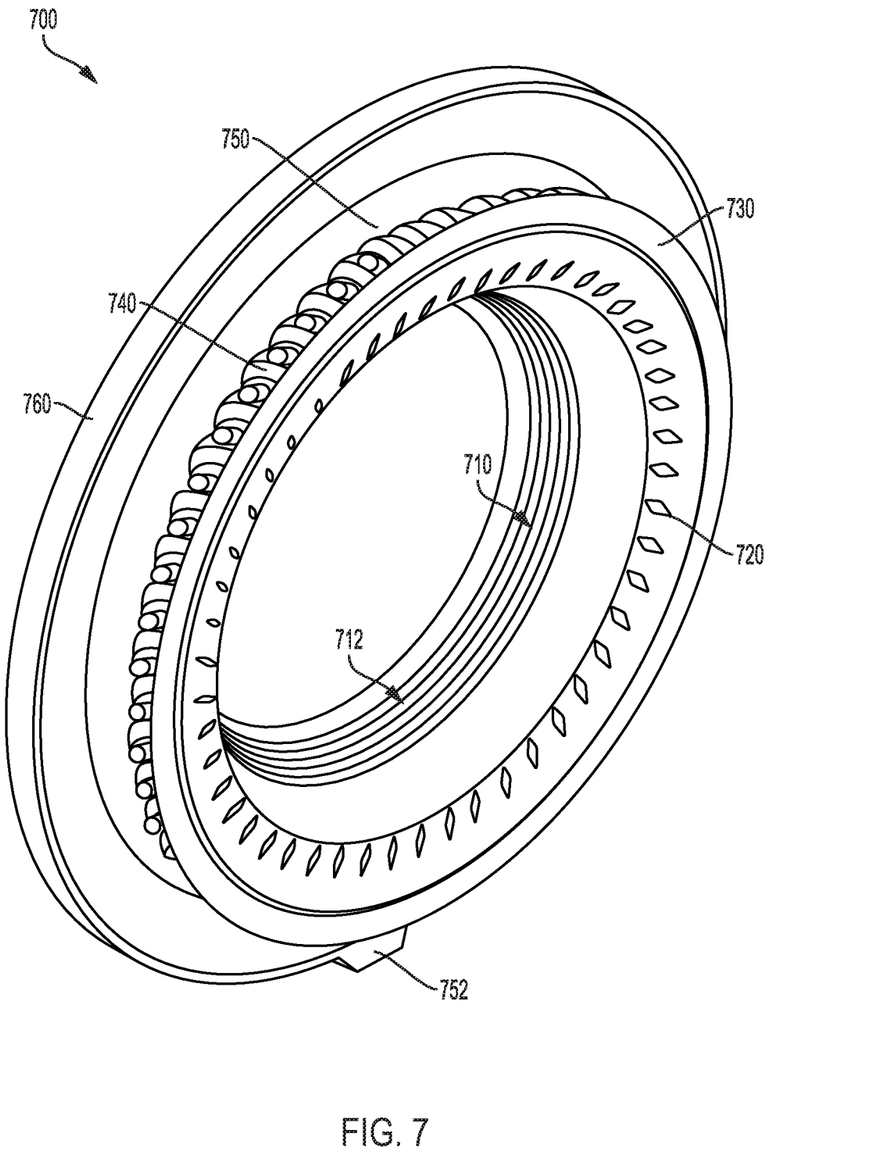
FIG. 7 is a perspective view of a cyclonic separator.

FIG. 7 is a perspective view of a cyclonic separator 700. The cyclonic separator 700 is an example of the cyclonic separator 520. It should be appreciated, however, that a cyclonic separator 700 may be located in a different position within the core 302. For example, the cyclonic separator 700 may be located before the compressor 314. The cyclonic separator 700 includes a cowl 710 including a plurality of openings 720 in fluid communication with a plurality of vortex chambers 740. A rim 730 defines an end of the cowl 710. The vortex chambers 740 are in fluid communication with a collection chamber 750, which also defines a body of the cyclonic separator 700. A flange 760 is connected to the collection chamber 750 to provide structural support and attachment points for the cyclonic separator 700.

The cowl 710 defines radially distal surface of a flowpath within the core 302. In an embodiment, the cowl 710 is the radially distal surface of the impeller shroud 514. That is, the cowl 710 helps restrict the flowpath of the compressed air from the compressor 314. Moreover, because the compressed air is rotating laterally within the cowl 710, particles entrained within the compressed air experience centrifugal force causing the particles to contact the cowl 710. In an embodiment, the cowl 710 includes ridges 712 that increase a drag force on the particles and help slow the axial movement of the particles.

The plurality of openings 720 are located toward an axially distal end of the cowl 710. In an embodiment, the openings 720 are axially elongated. The size, shape, and number of the openings 720 may be varied to bleed off a desired portion of the compressed air. For example, the number of openings 720 may be between approximately 10 and 100, preferably approximately 60. Each opening 720 is in fluid communication with a respective vortex chamber 740. As will be described in further detail below, the opening 720 leads to an inlet of the vortex chamber 740. The vortex chamber 740 creates an outer vortex that pulls solid particles into the collection chamber 750 and an inner vortex that pulls clean air to an outlet of the vortex chamber 740.

The collection chamber 750 includes one or more hollow regions that receive particles from the vortex chambers 740. In an embodiment, the collection chamber 750 is sealable. For example, the collection chamber 750 includes one or more vents 754 that may be opened or closed. The vents 754 are closed during operation of the gas turbine engine 300. Accordingly, the collection chamber 750 retains the collected particles during operation. Moreover, because the collection chamber 750 is not vented during operation, the collection chamber 750 does not cause a loss in flow. The collection chamber 750 is vented during a shutdown, cleaning, or startup operation. During a startup operation, venting via the collection chamber 750 helps reduce backpressure on the compressor 314.

Figure 8:
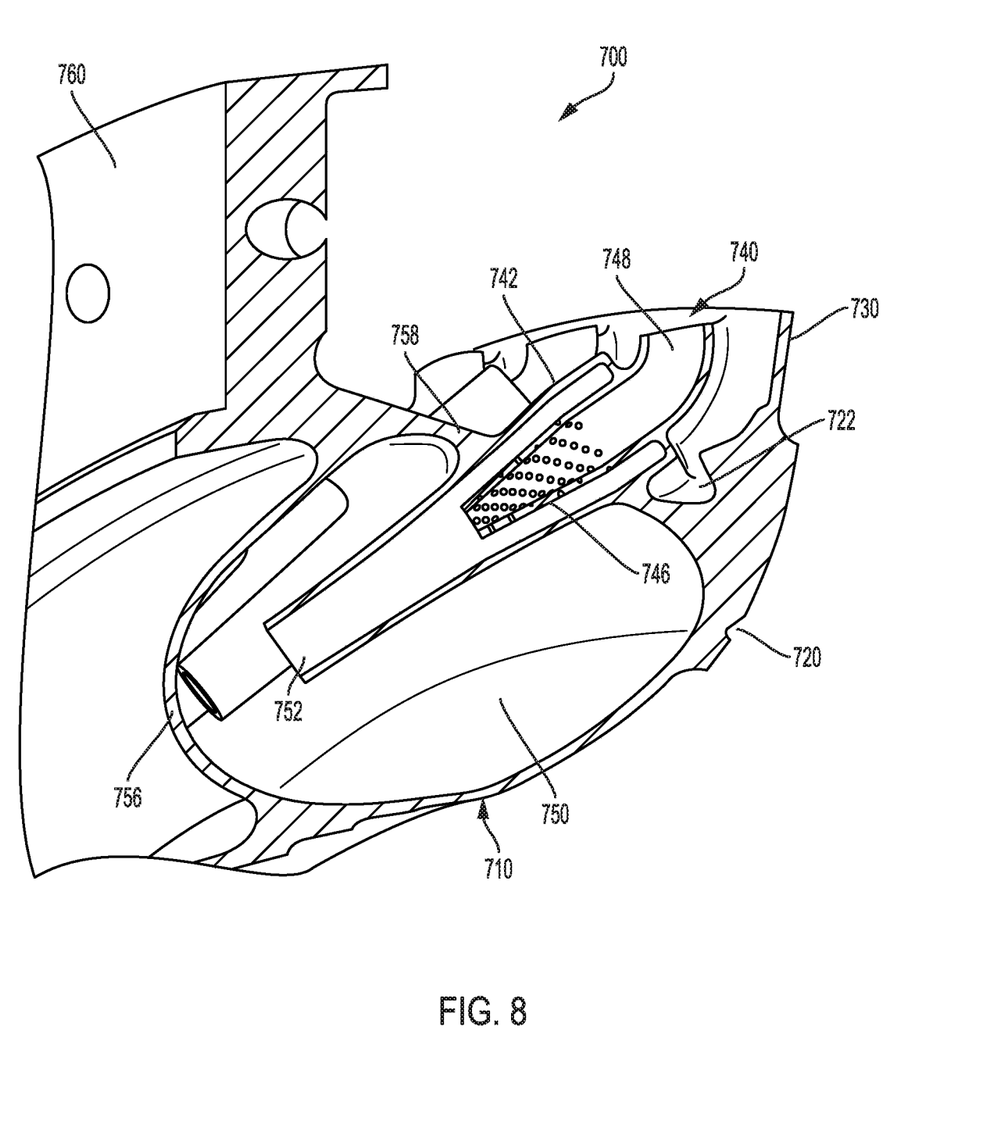
FIG. 8 is an axial cross-sectional view of the cyclonic separator in FIG. 7.
Figure 9:
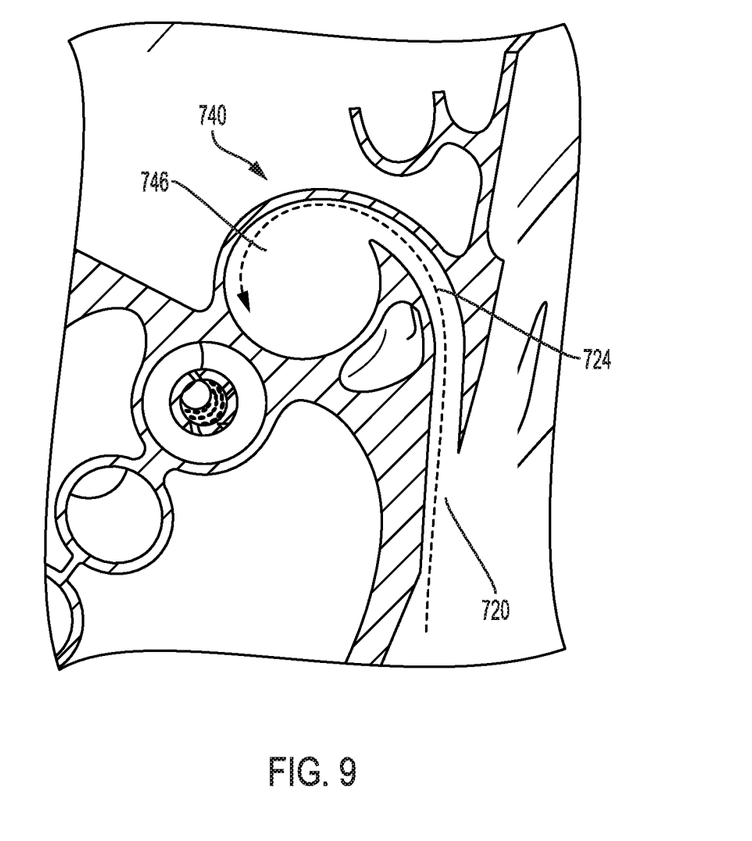
FIG. 9 is transverse cross-sectional view of the cyclonic separator in FIG. 7.

FIGS. 8 and 9 illustrate further details of the cyclonic separator 700. FIG. 8 is an axial cross-sectional view of the cyclonic separator 700 and one of the vortex chambers 740. FIG. 9 is transverse cross-sectional view of the cyclonic separator 700. The opening 720 is in fluid communication with the vortex chamber 740 via a curved passage 722. The curved passage 722 causes an airflow 724 to bend, starting a cyclonic motion. As best seen in FIG. 8, the curved passage 722 communicates with a first end of the cyclonic chamber through an outer wall 742 that defines the vortex chamber 740. The outer wall 742 has a generally conical shape and extends longitudinally to an open second end 752. A centrally located vortex finder 744 extends longitudinally from the first end of the vortex chamber 740. The vortex finder 744 defines an exit flowpath 748. The vortex finder 744 includes a cylindrical portion having a solid wall located adjacent the first end of the vortex chamber 740 and a conical portion 746 having a perforated wall extending longitudinally from the cylindrical portion.

The second end 752 of the vortex chamber 740 extends in a radially proximal direction into the collection chamber 750. The second end 752 is located near a radially proximal surface 756 of the collection chamber 750. The vortex chamber 740 may also be angled laterally.

In operation, the airflow 724 of compressed air enters the opening 720 and follows the curved passage 722 into the vortex chamber 740. The outer wall 742 and the cylindrical portion of the vortex finder 744 continue to bend the airflow 724 to form an outer vortex spiraling about the vortex finder 744. As the airflow 724 reaches the conical portion 746, solid particles entrained in the airflow 724 tend to move to the outer wall 742 due to centrifugal and drag forces. Clean air near the center of the vortex chamber 740 enters the vortex finder 744 via the perforations and via the inner vortex opening. The dirty air entraining the solid particles continues to move longitudinally and is discharged via the second end 752 into the collection chamber 750. The lateral angle of the vortex chambers 740 imparts a circular movement to the air within the collection chamber 750. The solid particles are drawn toward the radially distal wall 758 of the collection chamber rather than reentering the second end 752. The exit flowpath 748 provides a clean airflow, for example, the first cleaned airflow 610.

The components of the gas turbine engine 300 may be manufactured using an additive manufacturing (AM) process. AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process, direct metal laser melting (DMLM), uses an energy beam, for example, an electron beam or electromagnetic radiation such as a laser beam, to sinter or melt a powder material, creating a solid three-dimensional object in which particles of the powder material are bonded together. AM may be particularly applicable for manufacturing, for example, the cyclonic separator 700, which includes multiple concentric and coaxial subcomponents. In an aspect, the cyclonic separator 700 may be fabricated in a layer-by-layer manner along the longitudinal axis. The AM process may fabricate the cyclonic separator 700 as an integrated structure.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A system for separating debris from a core airflow in a gas turbine engine, comprising:
   a gas turbine engine comprising a compressor and a combustor in a serial flow relationship;
   a first separation device positioned upstream of and in fluid communication with the compressor, the first separation device adapted to remove coarse particles from the core airflow, wherein the first separation device comprises a plurality of circumferential vanes joined by a plurality of axially extending bands to define an inlet to a scavenge plenum; and
   a second separation device positioned downstream of and in fluid communication with the compressor and upstream of a combustor, the second separation device adapted to remove fine particles from the core airflow, wherein the coarse particles have a larger mean particle diameter than the fine particles wherein the second separation device is in fluid communication with a sealed collection chamber; and
   wherein the plurality of circumferential vanes are wedge-shaped bodies.

2. The system of claim 1, wherein the second separation device comprises a multi-stage separator includes a cyclonic separator and a clean air offtake downstream from the cyclonic separator.

3. The system of claim 1, wherein the compressor pulverizes coarse particles remaining in the air stream after the first separation device into fine particles.

4. The system of claim 1, further comprising:
   an inlet section for separating the core airflow from a bypass air flow that passes outside the gas turbine engine.

5. The system of claim 1, wherein the second separation device comprises:
   one or more separators that bleed a portion of the core airflow.

6. The system of claim 1, wherein the coarse particles have a mean particle diameter between 80 micrometers and 1000 micrometers and the first separation device removes at least 80 percent of coarse particles from an ambient air supply.

7. The system of claim 6, wherein the first separation device removes at least 95 percent of coarse particles from the ambient air supply.

8. The system of claim 6, wherein the first separation device removes at least 70 percent of fine particles having a mean particle diameter between 5 micrometers and 80 micrometers from an ambient air supply.

9. The system of claim 8, wherein the first separation device removes at least 80 percent of the fine particles.

10. The system of claim 1, wherein the fine particles include superfine particles having a mean particle diameter less than 5 micrometers and the second separation device removes at least 70 percent of superfine particles exiting the compressor.

11. The system of claim 10, wherein the second separation device removes at least 80 percent of superfine particles exiting the compressor.

12. The system of claim 1, wherein the first separation device is an inlet particle separator comprising the scavenge plenum positioned radially distal to an inlet to a core of the gas turbine engine.

13. The system of claim 12, wherein the plurality of circumferential vanes extend in a radially proximal direction along an inlet to a core of the gas turbine engine.

14. The system of claim 13, wherein the vanes are angled toward a forward air inlet of the gas turbine engine.

15. The system of claim 12, wherein the inlet particle separator-is vented outside of the core of the gas turbine engine.

16. The system of claim 12, wherein the inlet particle separator comprises:
   a centerbody positioned downstream of the inlet and defining an impact surface for directing the core airflow outward along a radial direction toward the scavenge plenum.

17. The system of claim 12, comprising:
   a rim positioned at a forward end of an inlet section for separating the core airflow from a bypass airflow, wherein the inlet particle separator is positioned radially distal to the rim.

* * * * *